March 17, 1942.   A. B. CLEVELAND ET AL   2,276,687
TIRE REPAIRING APPARATUS
Filed April 3, 1940    3 Sheets-Sheet 1
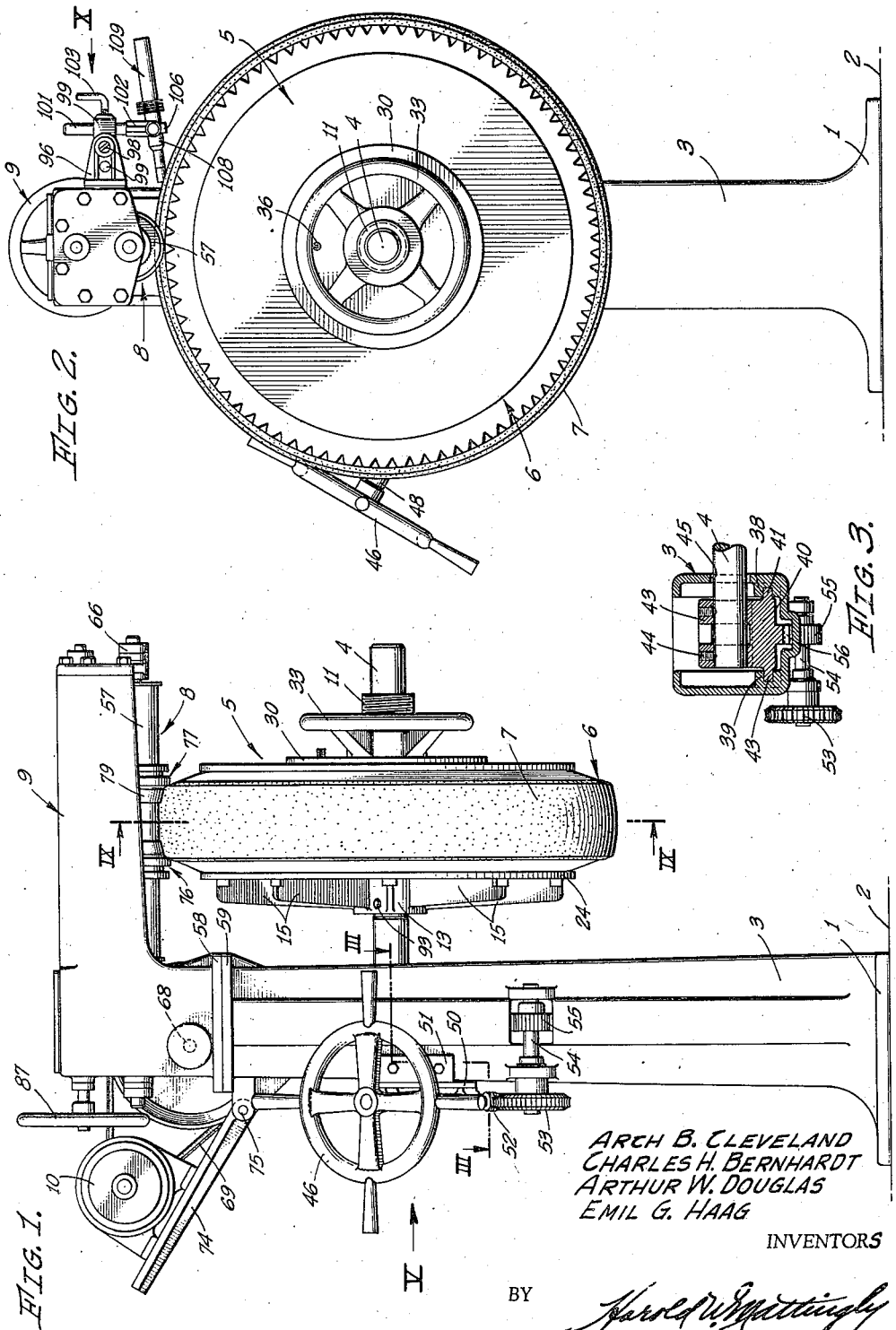
Arch B. Cleveland
Charles H. Bernhardt
Arthur W. Douglas
Emil G. Haag
INVENTORS
BY
ATTORNEY.

March 17, 1942.  A. B. CLEVELAND ET AL  2,276,687
TIRE REPAIRING APPARATUS
Filed April 3, 1940   3 Sheets-Sheet 2
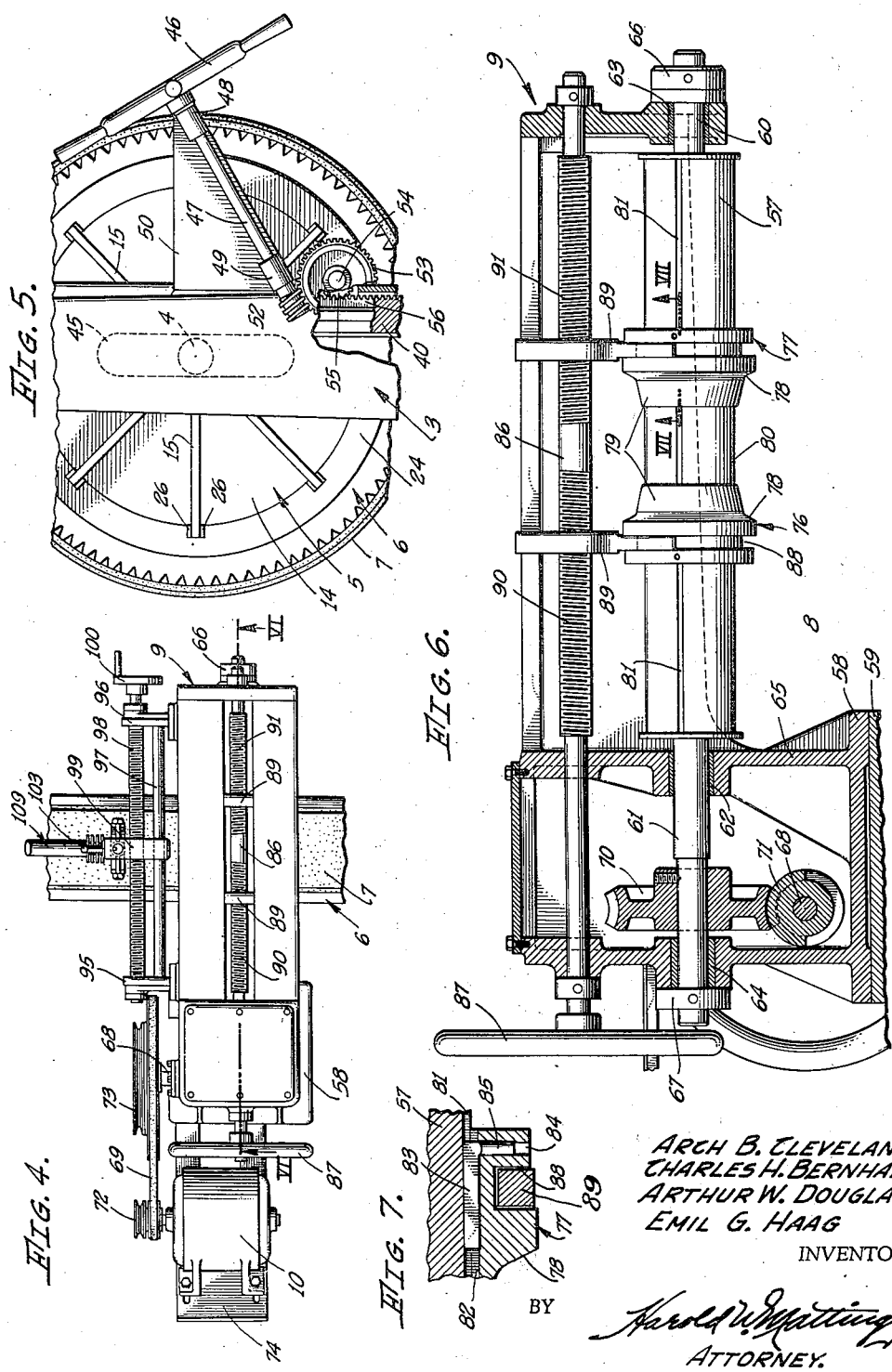

March 17, 1942. A. B. CLEVELAND ET AL 2,276,687
TIRE REPAIRING APPARATUS
Filed April 3, 1940 3 Sheets-Sheet 3

ARCH B. CLEVELAND
CHARLES H. BERNHARDT
ARTHUR W. DOUGLAS
EMIL G. HAAG
INVENTORS

BY Harold W. Mattingly
ATTORNEY

Patented Mar. 17, 1942

2,276,687

UNITED STATES PATENT OFFICE 2,276,687

TIRE REPAIRING APPARATUS

Arch B. Cleveland and Charles H. Bernhardt, Los Angeles, Arthur W. Douglas, Lynwood, and Emil G. Haag, Los Angeles, Calif.; said Bernhardt, said Douglas, and said Haag assignors to said Cleveland Application April 3, 1940, Serial No. 327,694

7 Claims. (Cl. 154—9)

Our invention relates to tire repairing apparatus and has particular reference to an apparatus for securing new tread material to the carcass of a worn tire.

Pneumatic tires such as those employed on automobiles and the like are subjected to concentrated wear on the tread portions of the tire with the result that the rubber comprising this tread portion may be worn completely away before other parts of the tire are subjected to any appreciable wear.

It has accordingly been the practice to repair these worn tires by vulcanizing upon the tire carcass a new layer of rubber to complete a new tread or road-contacting surface for the tire. This rubber is usually applied in an uncured or partially cured condition and then cured or vulcanized in place by the use of either a curling kettle or a vulcanizing mold. In either case the new rubber must be carefully and completely bonded with the tire carcass in order to prevent the new rubber from coming loose during the curing process and to insure against the trapping of air between the new rubber and the tire carcass, either of which conditions would result in a faulty final repair.

It is accordingly the practice to buff off the surface of the old tread rubber and generally roughen the same to facilitate obtaining a good bond between the old rubber and the new. The buffed carcass is then painted with an adhesive, usually rubber cement, and new tread rubber is applied over the layer of cement to build up the desired thickness of rubber to constitute the new tread of the tire.

The new tread material may comprise thin strips of uncured or semi-cured rubber to be applied to the cemented surface in layers until the desired thickness of new tread is achieved or may comprise a single layer of thick material known as "camel-back" encircling the old tire, the abutting ends of which are cut and fitted together to provide a smooth joint. The new rubber material is applied by hand to the previously prepared tire carcass and then should be firmly pressed or "stitched" into place to achieve a good bond between the camel-back and the tire carcass to force out from between the camel-back and the carcass any air that may have become entrapped therebetween and also to compact the new tread rubber prior to curing the same upon the tire.

The hand methods of pressing or ironing out the new rubber are slow and expensive and because of the relatively low pressures which can be applied by hand are not entirely effective in achieving a uniform bonding with the old carcass nor in completely removing any air which might be trapped between the camel-back and the carcass.

Attempts to use power machinery for applying this stitching pressure have not been satisfactory because the pressure applied to the camel-back was greater at the center of the tread portion of the tire than at the edges due to the substantially circular cross section of the tire. The camel-back is a semi-plastic material which flows under pressure with the result that the power stitchers employed prior to our invention caused this material to flow to build up a greater thickness of new material than was required at the edges of the tread portion while providing a much thinner layer of new tread rubber at the center of the tire than was desired. Furthermore, until our invention power stitchers were unsuited for most applications for the further reason that most tire repair shops are called upon to repair tires of various diameters, of various tread widths, and of various rim widths and the prior stitchers were unable to accommodate such a wide variety of sizes.

The curing of the tires after the camel-back has been applied may be performed by means of curing molds which are provided with matrices adapted to mold into the new rubber during the curing process the desired tread design or by curing the tire in a curing kettle, requiring the tread design to be cut into the newly vulcanized tread material after the curing operation is completed. Prior to our invention there has been no means available for cutting this tread design other than through the use of hand tread cutting tools with the result that the designs were not only imperfect but added considerably to the expense of repairing the tires.

It is accordingly an object of our invention to provide an apparatus for rolling or stitching new rubber into place on the tread portion of a previously prepared tire carcass which includes a means for supporting a tire in an inflated condition in contact with a power driven roller and for rotation therewith.

It is also an object of our invention to provide an apparatus of the character set forth in the preceding paragraph wherein the rotative force for rotating the inflated tire is transmitted thereto through the layer of new rubber by rotation of the power driven roller.

It is a still further object of our invention to provide an apparatus of the character set forth which includes a means for forcing the tire into engagement with the roller to provide an adjustment of the pressure which is applied thereby to the layer of new rubber.

It is an additional object of our invention to provide an apparatus of the character set forth in the preceding paragraphs which includes a flange means associated with the power driven roller for engaging the side edges of the layer of camel-back to prevent the undesired flowing of the camel-back under pressure and improper distribution of the material over the tread portion of the tire carcass.

It is also an object of our invention to provide in an apparatus of the character set forth in the preceding paragraphs a means for adjusting the spacing between the roller flanges to permit the accommodation of tires having different tread widths.

It is a still further object of our invention to provide a device of the character set forth in the preceding paragraphs which includes an adjustable rim means permitting the rotational supporting of tires having varying rim diameters.

It is a still further object of our invention to provide a device of the character set forth in the preceding paragraphs which includes an adjustable rim means permitting the rotational supporting of tires having varying rim widths.

It is an additional object of our invention to provide in an apparatus of the character set forth in the preceding paragraphs an adjustable supporting device for supporting the inflated tire carcasses to permit alignment of the tire with the roller flanges for each width of rim size.

Other objects and advantages of our invention will be apparent from a study of the following specification, read in connection with the accompanying drawings, wherein:

Fig. 1 is a side elevational view of one form of apparatus of our invention illustrating a tire mounted upon a tire supporting spindle in operative engagement with a power driven tread roller;

Fig. 2 is an end elevation of the apparatus illustrated in Fig. 1;

Fig. 3 is a fragmentary horizontal sectional view taken substantially along the line III—III of Fig. 1 and illustrating the manner in which the tire supporting spindle is mounted for adjustable vertical movement;

Fig. 4 is a top plan view of the apparatus illustrated in Fig. 1;

Fig. 5 is a fragmentary end elevational view taken in the direction of the arrow V of Fig. 1 with parts broken away to show the interior construction;

Fig. 6 is an enlarged vertical section taken substantially along the line VI—VI of Fig. 4 showing the details of construction of the power driven roller and the driving mechanism therefor;

Fig. 7 is an enlarged fragmentary sectional view through one of the roller flanges, this view being taken substantially along the line VII—VII of Fig. 6 to show the manner in which the flanges are non-rotatably and slidably secured to the roller;

Figure 8:
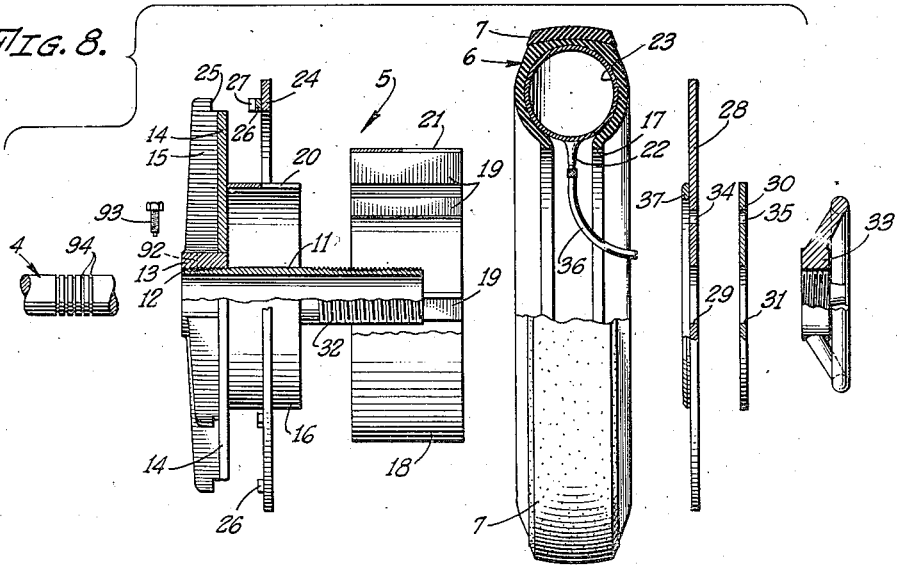
Fig. 8 is an exploded view with parts shown in section to illustrate the details of construction and manner of assembly of the tire supporting spindle and apparatus associated therewith.

Referring to the drawings, we have illustrated in Fig. 1 one embodiment of our invention as including a base member 1 adapted to be secured to a floor 2 or other supporting surface and from which rises a vertical supporting column 3. The column 3 carries a tire supporting spindle 4 upon which is mounted, by means of an adjustable rim structure 5, an inflated tire 6.

The tire 6 to be treated in our machine is illustrated as having previously had the old and worn tread rubber buffed off, the surface of the carcass roughened, rubber cement applied thereto and a single layer of new rubber or "camel-back" 7 of the desired width and thickness preliminarily pasted on the circumference of the tire. However, it will be understood that the new rubber 7 may be built up directly on the tire by winding thereon a plurality of layers of thin rubber strip material.

The tire supporting spindle 4 is adjustably disposed in such position as to place the camel-back into pressure contact with a power driven roller mechanism 8 which mechanism is preferably supported by means of a head structure 9 which includes the necessary driving elements for transmitting power from an electric motor or other suitable source of power 10 to the roller mechanism 8.

Figure 9:
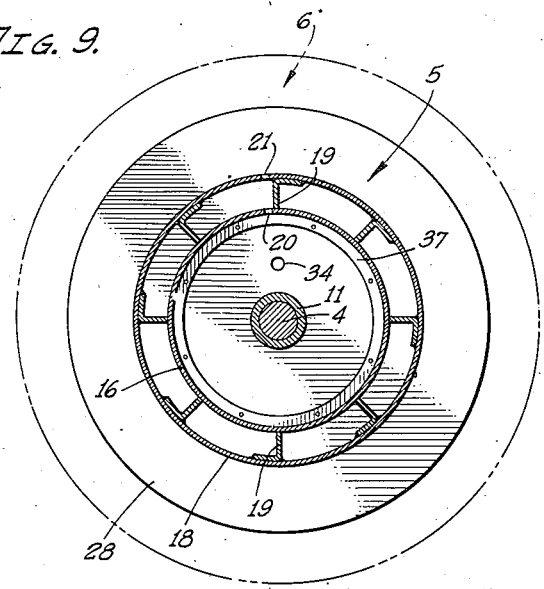
Fig. 9 is a cross sectional view through the tire supporting spindle taken substantially along the line IX—IX of Fig. 1.

Inasmuch as the machine of our invention should be capable of handling tires of various tread and rim widths and rim diameters, we prefer to make the adjustable rim assembly 5 of such form that such various sizes of tires may be conveniently mounted thereon. Such an adjustability may be obtained by employing a form of construction such as that illustrated in Figs. 1, 8 and 9. This construction includes an inner rotatable sleeve 11 which is slidably and rotatably received upon the tire supporting spindle 4. The innermost end of the sleeve 11 is preferably threaded as indicated at 12 to provide a connection to a hub portion 13 of an inner rim disk or flange 14. The disk 14 is secured to the hub portion by any suitable means, such as by welding, and is additionally reinforced by means of a plurality of bracing members or webs 15.

The outer surface of the inner rim disk carries a cylindrical rim band 16, this band having a diameter substantially equal to the rim diameter of the smallest size of tire desired to be mounted on the machine of our invention and having also a width corresponding to such minimum diameter so that tires of such minimum diameters may be mounted upon the rim band 16 with the flat portions 17 of the tire beads in contact therewith to permit inflation of the tire.

Whenever it is desired to mount upon the tire supporting spindle 4 a tire having a rim diameter larger than that afforded by the rim band 16, an auxiliary rim band 18 may be employed. The band 18 is cylindrical in shape and is provided with a plurality of longitudinally extending angle members 19 which are secured to the interior surface of the auxiliary band 18. The radially projecting legs of the angle members 19 are made of such length as to cause their innermost ends to mutually lie on a circle having a diameter of the rim band 16, thus permitting the band 18 to be slid over the rim band 16 and held in concentric alignment relative thereto by the engagement of the angle members 19 with the rim band 16.

Upon the rim band 18 the tire 6 may be mounted, suitable longitudinally extending slots 20 and 21 being provided in the rim bands 16 and 18 for receiving a valve stem 22 of an inner tube 23 previously placed within the tire 6 to provide the necessary resistance within the tire to oppose the relatively great pressure required to be applied to the new tread rubber.

To prevent such inflation from unduly spreading the sidewalls of the tire, rim disks are employed to engage and support the sidewalls. The left hand wall (as viewed in Figs. 1 and 8) may be supported by a rim disk 14 having a diameter designed to accommodate the smaller sizes of tires whose rim diameters will fit the band 16. Should a tire of a larger size, such as one mounted on the auxiliary rim band 18, be enough larger to prevent the relatively small diameter rim disk 14 from adequately supporting this side wall of the tire, such support for the side wall may be obtained by employing an extension member 24. The member 24 is in the form of a flat annulus having an inside diameter substantially equal to the outside diameter of the inner rim disk 14 and an outside diameter of a sufficient size to properly bear against the side walls of the large sized tire.

In order to accommodate this extension and hold it aligned in the same plane as that defined by the rim disk 14, we prefer to extend each of the webs 15 outwardly beyond the edge of the disk 14 and to notch these legs as indicated at 25 to receive spacing blocks 26. One or more of the spacing blocks may be made of a greater thickness than that required to completely fill the notch 25 and then channeled as indicated at 27 to receive the width of the bracing web 15 so as to adequately interlock the extension member 24 with the inner rim disk 14.

Similar support for the other side wall of the tire 6 may be obtained by employing an outer rim disk 28. This disk is provided with a central bore 29 adapted to receive the outwardly extending end of the sleeve 11. Inasmuch as the forces imposed upon the disk 28 are relatively large, we prefer to additionally reinforce this disk by employing a reinforcing washer 30 which may be of a smaller diameter than the disk 28 but also provided with an internal bore 31 adapted to receive the sleeve 11.

The disk 28 and washer 30 may be held in the proper side wall engaging position after the tire 6 is mounted on the auxiliary rim band 18 by providing male threads 32 on the outermost end of the sleeve 11 and by providing a nut member 33 adapted to be screwed on these male threads and slide the washer 30 and disk 28 inwardly along the sleeve 11 to clamp the side walls of the tire 6 between the disks 28 and 14. In order that the tire may be inflated after it has been mounted in this fashion, we provide bores 34 and 35 in the disk 28 and washer 30 through which an extension hose 36 secured at one end to the valve stem 22 may be extended.

It is intended that a number of outer rim disks 28 and a corresponding number and sizes of extension members 24 be provided so that the apparatus of our invention may be adapted to support tires having any desired diameter. Similarly, the auxiliary rim bands 18 are preferably supplied in a number of diameters and widths so that various rim widths and rim diameters may be accommodated upon the tire mounting.

In this connection it is desirable that the outer edge of the auxiliary rim band 18 be additionally supported, particularly when this band has a width considerably greater than the width of the rim band 16 and for this purpose we provide a supporting ring 37 which is secured to the inner face of the outer rim disk 28. This ring has an outside diameter substantially equal to the outside diameter of the rim band 16 so that when assembled the inwardly extending legs of the angles 19 may rest upon the outer surface of this ring as well as upon the outer surface of the rim band 16.

It will thus be observed that the rim structure 5 may be assembled in such fashion as to accommodate any desired size of tire and that when so mounted thereon the tire is rotatably supported upon the tire supporting spindle 4 by virtue of the rotatable engagement of the sleeve 11 with this spindle.

Since the tire which may be mounted upon the spindle will vary in outside diameters as well as in rim diameters it is necessary that the spindle 4 be mounted for vertical adjustment in order to bring the new rubber 7 into proper engagement with the roller mechanism 8. Such an adjustable mounting of the spindle 4 may be readily achieved through the use of a construction such as that illustrated in Figs. 1, 3 and 5 wherein the supporting column 3 is illustrated as being hollow and formed on its forward interior surface with guiding channels 38 and 39. A supporting block 40 provided with flanges 41 and 42 receivable in the channels 38 and 39 may thus be mounted within the interior of the hollow column 3 for vertical sliding movement. The supporting block 40 is accordingly provided with a yoke member 43 which is provided with a bore adapted to receive the spindle 4, which spindle may be secured therein as by means of set screws 44 threadedly engaged with the spindle encircling portion of the yoke member 43.

Vertical sliding movement of the supporting block 40 may be permitted by providing an elongated slot 45 in the inside face of the hollow column 3 through which the spindle 4 may be extended. This vertical sliding movement of the supporting block 40 is preferably controlled by means of a suitable power apparatus which may include a hand wheel 46 which is secured to the outermost end of an angularly disposed shaft 47 journaled for rotation by means of bearing members 48 and 49 carried in an angularly disposed bracket 50 which is in turn secured to the forward face of the hollow column 3 as by means of bolts 51. The lower end of this shaft 47 may be fitted with a worm 52 drivably engaged with a worm wheel 53 which is in turn secured to a suitably journaled transversely extending shaft 54. The shaft 54 may carry a pinion 55 disposed in a position to drivably engage a gear rack 56 formed on the outer surface of the supporting block 40. Thus, rotation of the hand wheel 46 will be translated into a corresponding vertical movement of the supporting block 40 to move the tire supporting spindle 4 and tire 6 carried thereby toward and away from the roller mechanism 8. By this means the outer periphery of the tire 6 may be brought into engagement with the roller mechanism 8 in such fashion as to provide any desired degree of pressure upon the new rubber 7. While we have illustrated and described a hand actuated rack and pinion device for effecting this adjustment, it will be apparent to those skilled in this art that other mechanisms, such as feed screws or hydraulic cylinders will also be suitable.

When the tire has been brought into this cooperative relation with the roller mechanism 8, the motor 10 is started to cause rotation of the roller mechanism 8 to roll the new rubber firmly into place upon the outer periphery of the tire 6. The roller mechanism 6 preferably comprises an elongated shaft or roller 57 of relatively large diameter, three to four inches being an advantageous size for use with passanger car and truck tires. The roller 57 is supported for rotation in the head structure 9, which structure comprises a hollow housing secured to the upper end of the supporting column 3 by suitable attaching means passed through abutting flanges 58 and 59. The housing 9 is provided with an open bottom through which the roller 57 is exposed and serves to support the roller 57 for rotation about its axis. The roller 57 is accordingly provided with reduced diameter shaft extensions 60 and 61 which are journaled for rotation in bearing members 62, 63 and 64 provided in opposite ends of the housing portion 9 and in an intermediately disposed web portion 65 thereof. Endwise movement of the roller 57 is prevented by means of thrust collars 66 and 67 secured upon opposite ends of the shaft extensions 60 and 61 in a position to bear against the outermost faces of the journals 63 and 64.

Power for rotating the roller 57 may be derived from the electric motor 10 and transmitted thereto by providing a countershaft 68 adapted to be drivably connected to the motor 10 as by means of a belted connection 69 and adapted to be drivably engaged with the roller shaft extension 61 as by providing a worm gear 70 thereon suitably enmeshed with a worm 71 secured to the countershaft 68.

In order that a choice of rotational speeds of the roller 57 may be available, we prefer to engage the belt 69 with a motor pulley 72 and a driven pulley 73, each of these pulleys being provided with a pair of belt grooves affording different drive ratios between the motor 10 and the countershaft 68. Suitable belt tension may be maintained by mounting the motor 10 upon a motor bracket 74 which is in turn hingedly secured to the upper end of the column 3 as by a hinge pin 75, so that the weight of the motor 10 tending to cause movement of the bracket 74 about its hinge 75 will provide sufficient tension in the belt 69 to permit the transmittal of the power required.

As pointed out hereinbefore, the use of a cylindrical roller such as the roller 57 ordinarily tends to cause the new rubber to flow during the time it is brought into engagement with the roller so that as to provide a thin section near the center of the new rubber strip. In order to prevent this flowing of the new rubber we provide a pair of roller flanges 76 and 77 which may be disposed on the roller 57 in such spaced relation relative to each other as to provide an engagement between a flange portion 78 thereof and the outer edges of the new rubber strip so as to prevent this material from flowing along the length of the roller 57. Furthermore, each of the roller flanges 76 and 77 is provided with an inwardly directed tapered portion 79 which, together with the exposed portion 80 of the roller 57 included therebetween, define a generally curved surface substantially conforming to the transverse curve of the strip of new rubber 7. This relationship is clearly illustrated in Fig. 1.

In order that the spacing between the roller flanges 76 and 77 may be adjusted to conform to the tread width of the particular tire which is to be mounted upon the tire supporting spindle 4, we prefer to support each of these roller flanges in a slidable fashion upon the roller 57. This may be readily accomplished by providing a longitudinally extending keyway 81 in the roller 57 and a corresponding keyway 82 within the interior bore of each of the flanges 76 and 77 and by placing within these keyways a feather 83 adapted to create a drivable engagement between each of the flanges 76 and 77 and the main roller 57.

The feather 83 is preferably loosely fitted into the keyways 81 and 82 so that it may be slid therealong in response to sliding movement of the roller flanges along the length of the roller 57. The feather 83 may be permanently associated with its corresponding roller flange by providing a radially extending bore 84 adapted to receive an outwardly turned end 85 of the feather 83.

The relative positions of the roller flanges 76 and 77 may be adjusted and held in such adjusted position by means of an adjusting mechanism such as that illustrated in Fig. 6 as including a feed screw 86 disposed above and in parallelism with the roller 57 and journaled for rotation by means of suitable journals provided in the ends of the housing 9 and in the intermediately disposed web portion 65. Manual rotation of the feed screw 86 may be effected by means of a suitable hand wheel 87 and such rotation may be translated into slidable movement of the roller flanges 76 and 77 as by providing in each of these flanges a circumferentially extending recess 88 each adapted to receive a pronged fork member 89 threadedly engaged upon the feed screw 86. In order that rotation of the feed screw 86 may move the forks 89 and the flanges 76 and 77 in opposite directions along the roller 57, the feed screw 86 is formed with a right hand thread 90 on one half thereof while the other half is threaded with a left hand thread 91, the junction between these two threaded portions occurring substantially midway of the length of the roller 57.

It will thus be apparent that rotation of the hand wheel 87 will cause a corresponding movement of the forks 89 toward or away from each other so as to effect an adjustment of the spacing between the flange portions 78 of the roller flanges 76 and 77 to permit these flanges to be spaced apart and held in such spaced relation in correspondence with the width of the new rubber upon the particular tire to be manipulated in the stitcher machine.

It will be noted that with the apparatus just described for adjusting the spacing between the roller flanges 76 and 77, the point on the roller 57 which is engaged by the center line of the strip of new rubber remains in a stationary position relative to the supporting column 3 and the head portion 4 of the machine irrespective of the spacing between these roller flanges. It will also be noted that when the adjustable rim structure 5 is adjusted to accommodate tires having a rim width wider than the minimum afforded by the rim band 16, the inner rim plate 14 must be moved inwardly along the tire supporting spindle 4 a distance equal to one-half the increase in rim width in order to maintain the center of the camel-back strip aligned with the center line of the roller which is disposed midway between the roller flanges 76 and 77. Furthermore, when properly located in such position the entire adjustable rim structure 5 should be held against slidable movement along the tire supporting spindle 4 in order to insure and maintain the required alignment between the new rubber strip and the roller flanges 76 and 77.

We accordingly provide a threaded bore 92 in the hub portion 13 of the inner rim flange 14 adapted to threadedly receive a bolt 93. The inner portion of the tire supporting spindle 4 is provided with a plurality of circumferentially extending grooves or channels 94 adapted to receive the inner end of the bolt 93 when it is screwed into the threaded bore 92. If the bolt 93 is screwed into the bore 92 a distance sufficient to penetrate into the grooves 94 but not sufficiently far to strike the bottom of these grooves, the adjustable rim structure 5 will still remain rotatably supported upon the spindle 4, but slidable movement thereof axially along the spindle will be prevented by engagement of the bolt with the sides of the channel 94 in which the bolt is received. Each of the plurality of channels 94 is accordingly spaced from each other a distance equal to one-half the increase in rim width effected by substituting auxiliary rim flanges 18 of progressively increasing standard widths.

In setting up the apparatus and obtaining the proper adjustment between the position of the tire and the center of the roller mechanism 8, the following procedure is recommended. The required diameter and width of auxiliary rim flange 18 is selected and the adjustable rim structure 5 is assembled with the tire in place, the elements thereof being locked to each other by the nut 33. The tire is then inflated after which the bolt 93 is retracted a sufficient distance to remove the inner end thereof from the one of the channels 94 with which it is engaged and the entire adjustable rim structure 5 is then slid along the length of the tire supporting spindle 4 until the center line of the new tread strip 7 is accurately aligned with the center of the roller mechanism 8 at which time the bolt 93 is again screwed inwardly to engage the one of the grooves 94 which is then positioned in direct alignment with the bolt 93, thus securing the adjustable rim structure 5 against subsequent axial movement along the tire supporting spindle 4.

Figure 10:
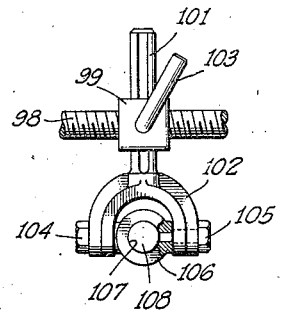
Fig. 10 is an enlarged fragmentary elevational view in the direction of the arrow X of Fig. 2 with parts broken away to show additional details of construction.

Reference has been had hereinbefore to the provision of a mechanism upon the stitcher of our invention for cutting tread grooves in the layer of new rubber 7 after that layer has been cured in a curing kettle or other curing device which does not mold into the new tread the desired tread pattern. This apparatus may be constructed along the lines illustrated in Figs. 2, 4 and 10 and which includes a pair of rearwardly extending supporting brackets 95 and 96 secured to opposite ends of the rear side of the head structure 9. These brackets are employed to support a longitudinally extending guide rod 97 and a rotatably supported feed screw 98 upon which is mounted a feed nut 99 provided with a threaded bore for receiving the feed screw 98 and a guiding bore for receiving the guide rod 97.

Rotation may be imparted to the feed screw 98 by means of a suitable hand wheel 100 for the purpose of adjusting the position of the feed nut 99 relative to the length of the feed screw 98 and accordingly relative to the width of the new tread strip 7 which has been cured in place upon the tire 6.

As shown in Fig. 2, the feed nut 99 is provided at its rearward end with a vertically extending bore adapted to receive the shank 101 of a yoke member 102, provision being made for locking the shank 101 in any desired vertical position relative to the feed nut 99 by employing a set screw or J bolt 103. The lower end of the yoke member 102 is formed as a semi-circular fork, the ends of the legs of which are provided with transverse bores adapted to receive pivot pins 104 and 105. The pivot pins 104 and 105 are in turn engaged with suitable pivot seats formed on opposite sides of a ring member 106 so that the ring member 106 may be pivotally moved relative to the axis defined by the pivots 104 and 105. The ring member 106 is provided with an internal bore 107 adapted to closely receive a shank 108 of a tread grooving means 109 which may comprise a conventional tire grooving iron or knife.

The construction just described permits the positioning of the tire grooving iron 109 in any desired position relative to the width of the new tread strip 7 through the use of the handle 100 while the yoke and ring mounting permits the ready movement of the cutting end portion of the tire grooving iron into and out of engagement with this new tread strip as desired. This iron may accordingly be employed to cut circumferentially extending grooves in the newly vulcanized tread rubber at any desired spacing relative to each other and relative to the width of this rubber so as to provide at least a uniform basis upon which additional hand cuts may be made for creating a complete tread pattern in the newly vulcanized rubber.

Furthermore, the hand wheel 100 may be rotated first in one direction and then in another during the time the tire grooving iron 109 is held in cutting relationship with the tread of the material so as to move the iron laterally back and forth across the width of the previously cured tread material during the time this material is being circumferentially moved past the cutting portion of the time grooving iron. It will be apparent that proper coordination of the movements of the hand wheel with the speed of rotation of the tire will permit cutting in the tread portion, during one or more complete revolutions of the tire, a complete tread design of various forms or character.

It usually becomes necessary to trim the side edges of the tread material after it has been cured in order to provide a uniform, neat appearing edge. The above described apparatus may also be used for trimming the edges of the tread material by employing on the grooving iron a cutting element which is properly shaped to trim the edges of the tread in the desired manner. This method of trimming offers the advantage over the hand methods previously employed of insuring that the trimmed edges be straight and true as compared with the wavy and eccentric edges previously obtained by hand trimming methods.

From the foregoing it will be observed that we have provided a tire repairing apparatus which is particularly adapted to the rolling or stitching of new rubber strips upon the tread portion of a worn tire carcass by power actuated means and which is so constructed as to overcome the various disadvantages found in prior power operated stitching machines.

It will be further observed that the device of our invention is so constructed as to accommodate various sizes and widths of tires and that the change required to adapt the machine for a different size of tire may be readily and easily made.

Attention is also called to the fact that the adjustable rim device of our invention permits not only the mounting of tires of various sizes upon the rim structure, but also permits the adjustment of the tire in an axial direction to permit accurate alignment of the tread portion of the tire with the roller mechanism. In this connection it will be observed that the structure described for permitting this axial adjustable movement also permits the entire adjustable rim assembly and an inflated tire mounted thereon to be completely removed from the machine so that intermediate hand operations may be performed upon the tire at a location remote from the machine without necessitating the deflation of the tire and the removal of the tire from the rim.

It will also be observed that the apparatus of our invention is adapted for use as a tread forming machine in that means is provided for cutting circumferentially extending grooves and designs in the tread portion of a recently repaired and vulcanized tire so as to eliminate or reduce the amount of hand work which is required to provide a tread pattern therein.

While we have shown and described the preferred embodiment of our invention, we do not desire to be limited to any of the details of construction shown or described herein, except as defined in the appended claims.

We claim:

1. In a tread rolling apparatus, the combination of: a supporting member including means for mounting a tire for rotation about its axis; a tread engaging roller carried on said support in a position engaging the tread of said tire; means for rotating said roller; a pair of flange means mounted on said roller for slidable movement therealong; means drivably engaging each of said flanges with said roller; a rotatable feed screw having oppositely handed threaded portions; a pair of fork members, one of each threadedly engaged with one portion of said feed screw and coupled to move one of said flanges; and means for rotating said feed screw, whereby rotation thereof in one direction moves said flanges toward each other and rotation in the opposite direction moves said flanges away from each other.

2. In a tread rolling apparatus, the combination of: a support; a tread engaging roller carried by said support; a tire supporting spindle carried by said support; an adjustable rim structure slidably and rotatably received on said spindle for supporting tires of different widths, whereby said rim structure and a tire carried thereby may be moved axially along said spindle to bring the tread portion of said tire into alignment with the center of said roller; and a securing means carried by said rim structure and engageable with said spindle in each of a plurality of predetermined positions for locking said rim structure against sliding movement while permitting rotation thereof, whereby said rim structure may be held in positions aligning the tread portion of tires of different tread widths with the center of said roller.

3. In a tire repairing apparatus, the combination of: a support; a tread engaging roller mounted for rotation on said support; means drivably engaged with said roller for imparting rotation thereto; tire supporting means on said support for engaging the rim upon which an inflated tire is mounted and supporting said inflated tire for rotation about its axis, said tire supporting means being disposed on said support in a position bringing the tread of said tire into pressure engagement with said roller, whereby rotation of said roller rotates said tire to apply said pressure to all parts of said tread; and a tread grooving means mounted on said support for adjustable movement toward and away from the tread portion of said tire, whereby said grooving means may be brought into engagement with the tread portion to permit the cutting of circumferentially extending grooves therein while said tire is being rotated by said roller.

4. In a tread rolling apparatus including a roller and a tire supporting means for supporting a tire in a position engaging the tread portion thereof with said roller, an adjustable rim structure rotatably mounted on said tire supporting means comprising: a pair of rim flanges; rim band supporting means carried on said flanges; a rim band member including means engageable with said rim band supporting means; means mounting said flanges for movement toward and away from each other to permit reception therebetween of tires of different widths; and clamping means cooperating with said mounting means for forcing said flanges toward each other, whereby rim band members of different widths and diameters may be supported on said rim band supporting means and clamped between said rim flanges to provide a rim surface of any predetermined width and diameter for supporting a corresponding size of tire.

5. In a tread rolling apparatus including a roller and a tire supporting means for supporting a tire in a position engaging the tread portion thereof with said roller, an adjustable rim structure rotatably mounted on said tire supporting means comprising: a pair of rim flanges; a cylindrical supporting member carried by each of said flanges in a position extending toward the other of said flanges; a rim band comprising a hollow cylinder having a plurality of longitudinally and inwardly extending spacing members secured to the interior thereof in substantially uniform spaced relation to each other, the inner ends of all of said spacing members lying on a circle having a diameter equal to the diameters of said cylindrical supporting members; means mounting said flanges for movement toward and away from each other to permit reception therebetween of tires of different widths; and clamping means cooperating with said mounting means for forcing said flanges toward each other, whereby the inner ends of the spacing members of rim bands of different widths and diameters may be placed in encircling relation with said cylindrical supporting members and clamped between said flanges to provide a rim surface of any predetermined diameter for supporting a corresponding size of tire.

6. In a tread rolling apparatus including a roller and a tire supporting spindle for rotatably supporting a tire in a position engaging the tread portion thereof with said roller, an adjustable rim structure mounted on said spindle comprising: a sleeve rotatably supported on said spindle; a rim flange secured to one end of said sleeve and extending radially outward therefrom; a complementary rim flange slidably supported on said sleeve for movement to vary the spacing between said flanges to permit reception therebetween of tires of different widths; rim band supporting means carried on said flanges; a rim band member including means engageable with said rim band supporting means; and another member threadedly engaged with the other end of said sleeve in a position to bear against said complementary flange and move said flanges toward each other, whereby rim band members of different widths and diameters may be supported on said rim band supporting means and clamped between said rim flanges to provide a rim surface of any predetermined width and diameter for supporting a corresponding size of tire.

7. In a tread rolling apparatus including a roller and a tire supporting means for supporting a tire in a position engaging the tread portion thereof with said roller, an adjustable rim structure rotatably mounted on said tire supporting means comprising; a pair of circular rim flanges; rim band supporting means carried on said flanges; a rim band member including means engageable with said rim band supporting means; means mounting said flanges for movement toward and away from each other to permit reception therebetween of tires of different widths; clamping means cooperating with said mounting means for forcing said flanges toward each other, whereby rim band members of different widths and diameters may be supported on said rim band supporting means and clamped between said rim flanges to provide a rim surface of any predetermined width and diameter for supporting a corresponding size of tire; a rim flange extension member comprising an annulus having an interior diameter substantially equal to the diameter of one of said rim flanges; and means for mounting said extension member in encircling relation with said one rim flange and in the plane thereof to effectively increase the diameter of said rim flange.

ARCH B. CLEVELAND.
CHARLES H. BERNHARDT.
ARTHUR W. DOUGLAS.
EMIL G. HAAG.